(12) United States Patent
Tovar et al.

(10) Patent No.: US 9,045,078 B2
(45) Date of Patent: Jun. 2, 2015

(54) ARRANGEMENT FOR COVERING A COMPONENT, COMPONENT AND MOTOR VEHICLE

(75) Inventors: Johannes Tovar, Ingolstadt (DE); Jens Dietmar Reuschel, Ingolstadt (DE); Christoph Schmitz, Abensberg (DE); Richard Mohos, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/342,654

(22) PCT Filed: Jul. 27, 2012

(86) PCT No.: PCT/EP2012/003204
§ 371 (c)(1),
(2), (4) Date: Jul. 10, 2014

(87) PCT Pub. No.: WO2013/029727
PCT Pub. Date: Mar. 7, 2013

(65) Prior Publication Data
US 2014/0328077 A1    Nov. 6, 2014

(30) Foreign Application Priority Data
Jan. 9, 2011    (DE) .......................... 10 2011 112 134

(51) Int. Cl.
*B60Q 3/02*    (2006.01)
*B62D 1/04*    (2006.01)
*B62D 1/06*    (2006.01)

(52) U.S. Cl.
CPC ................ *B60Q 3/024* (2013.01); *B62D 1/046* (2013.01); *B62D 1/06* (2013.01)

(58) Field of Classification Search
CPC .................................. B60Q 3/024; B21D 1/06
USPC ............................................ 362/36, 488, 511
See application file for complete search history.

(56) References Cited

U.S. PATENT DOCUMENTS

| 1,093,441 A * | 4/1914 | Laurance ..................... 362/544 |
| 2007/0153535 A1 | 7/2007 | Bostick |
| 2010/0194080 A1* | 8/2010 | Paxton et al. ............... 280/728.3 |

FOREIGN PATENT DOCUMENTS

| DE | 10113493 | 9/2002 |
| DE | 20311729 | 10/2003 |
| DE | 60017640 | 3/2006 |
| DE | 102007060347 | 6/2008 |
| DE | 102008035105 | 12/2009 |
| DE | 102008035107 | 12/2009 |

(Continued)

OTHER PUBLICATIONS

English Language International Search Report for PCT/EP2012/003204, mailed Oct. 23, 2012, 2 pages.

(Continued)

*Primary Examiner* — David V Bruce
(74) *Attorney, Agent, or Firm* — Staas & Halsey LLP

(57) ABSTRACT

An arrangement for covering a component, in particular a steering wheel rim, of a motor vehicle, which component has an in particular encircling fastening depression. The arrangement has a cover composed in particular of a flexible and/or non-slip material, and at least one fastening element, in particular a clamping element, for fastening the edges of the cover, which is placed around the component, in the fastening depression. The at least one fastening element is designed as a light source and/or has at least one light source.

20 Claims, 4 Drawing Sheets

(56) References Cited

FOREIGN PATENT DOCUMENTS

| | | |
|---|---|---|
| DE | 102008038442 | 2/2010 |
| DE | 102009059670 | 6/2011 |
| DE | 102011112134.3 | 9/2011 |
| EP | 1069023 | 1/2001 |
| EP | 1403167 | 3/2004 |
| GB | 1398685 | 6/1975 |
| WO | 2009/030223 | 3/2009 |
| WO | PCT/EP2012/003204 | 7/2012 |

OTHER PUBLICATIONS

German Office Action for German Priority Patent Application No. DE 10 2011 112 134.3, issued Jun. 4, 2012, 6 pages.

WIPO English Language Translation of International Preliminary Report on Patentability for PCT/EP2012/003204, Downloaded from WIPO Website Mar. 4, 2014, 7 pages.

English Language Copy of International Search Report for PCT/EP2012/003204, mailed Oct. 23, 2012, 2 pages.

* cited by examiner

ARRANGEMENT FOR COVERING A COMPONENT, COMPONENT AND MOTOR VEHICLE

CROSS REFERENCE TO RELATED APPLICATIONS

This application is based on and hereby claims priority to International Application No. PCT/EP2012/003204 filed on Jul. 27, 2012 and German Application No. 10 2011 112 134.3 filed on Sep. 1, 2011, the contents of which are hereby incorporated by reference.

BACKGROUND

The invention relates to an arrangement for covering a component, in particular a steering wheel rim, of a motor vehicle. In addition, the invention relates to motor vehicle.

In motor vehicles it is frequently the case, usually for reasons of comfort and design, that components are additionally provided with a cover, and are consequently surrounded thereby. The most prominent example of such a component is the steering wheel rim of a steering wheel. Here, for example a steering wheel cover can be fitted on to leather, imitation leather, fabric or the like. A plurality of variants for fastening the cover, which is to be placed on the component in a non-slip fashion and such that it can be easily grasped, are known, in particular with respect to a steering wheel, in the related art.

It is therefore possible to provide that the cover which is placed around the component is sewn. However, seams are disadvantageous since they are extremely complicated to fabricate and can become detached again over the service life of the motor vehicle. For this reason it has been proposed, in another fastening method, ultimately to clamp the cover tight, in particular by a fastening element in a depression or cutout in the component. In this context such a fastening element which secures the cover by clamping forces and frictional forces can also be referred to as a "clip".

Such an arrangement is known, for example, from GB 1 398 685 B. A steering wheel having a steering wheel rim is proposed therein, having a continuous, encircling depression. A cover made of a flexible material covers the steering wheel rim and is fastened by accommodating longitudinal edges of the cover lying opposite one another in the depression and by securing them therein by an insert (fastening element).

A disadvantage of the use of such fastening elements is that they frequently do not contribute to the design since merely placing a fastening element within the cover can, for example, have a disruptive effect.

SUMMARY

One possible is therefore simultaneously improving the functionality and the visual effect of a component which is covered in such a way.

The inventors propose an arrangement for a component. The component has an, in particular encircling, fastening depression. The arrangement has a cover which is composed, in particular, of a flexible and/or non-slip material and at least one fastening element, in particular a clamping element, for fastening the edges of the cover which is placed around the component, in the fastening depression. The fastening element, or at least one fastening element, is embodied as a light source and/or has at least one light source.

It is therefore proposed to configure the fastening element, that is to say, in particular, a clamping element or clip, in such a way that it can be at least partially illuminated in that at least part of the fastening element acts as a light source, wherein in the case of a plurality of fastening elements just some of the fastening elements can also be embodied as light sources or can have light sources. In this way, the fastening element can serve as a display device or as a display medium which advantageously provides, in particular on the steering wheel rim of a steering wheel, new display possibilities and new covering possibilities. Ultimately, a "clip" which can be at least partially illuminated is therefore proposed.

In this context, it can be particularly advantageously provided that the fastening element comprises a lightguide and/or is a lightguide. Lightguides constitute light sources which can be used in a particularly advantageous way for a fastening element since even extended lightguides, which can, in particular, be illuminated uniformly and are made of a wide variety of materials, are known, which materials can also have the necessary flexibility so that the fastening element can be pressed into the depression and performs there its effect of securing the cover. All that then needs to be done is to couple a lighting device to the lightguide as a light source, in particular to the fastening element itself or to the component, more details of which are given later. Lightguides provide, in particular, a multiplicity of possibilities for the specific embodiment of the light source and therefore the function which is provided as a display device. Lightguides are therefore known which can form a planar light source which is illuminated uniformly. Such a lightguide can comprise, for example, diffuser particles and/or at least one roughened surface. However, lightguides are also known which can extract the light at specific, defined locations and therefore implement, for example, specific patterns and/or geometric shapes which consequently not only improve the appearance of the component but can additionally also be used for conveying information. It is also possible to provide that the lightguide has a reflective coating on the surfaces which do not serve as an exit face or coupling face, in order to avoid losses. Suitable lightguides are widely known in the related art and will not be presented here in more detail.

As already mentioned, it is, however, possible for the fastening element, or at least one fastening element, to comprise a lighting device which is coupled to the lightguide. A lighting device, preferably a LED, can therefore already be arranged on or in the fastening element itself. Such a lighting device can be supplied with the energy which is necessary for operation, for example by a steering wheel column or other way to supply the component. LEDs are appropriate since they can be implemented with an extremely small size. In order to feed energy to the fastening element for the operation of an LED it is possible, for example, to implement a slip coupling and/or a spring contact in the case of a fastening element which is inserted in the depression.

It is also possible to provide that the cover comprises a plurality of cover sections which are each assigned a fastening element. The cover consequently does not have to be manufactured as a complete element which covers the entire component but rather can comprise a plurality of cover sections, for example in the case of a steering wheel rim it can comprise cover sections which always cover a part angle of the steering wheel rim and which can also each be assigned a fastening element.

For example leather or imitation leather or fabric can be used as the material of the cover. Of course, other materials which provide a suitable surface and are appropriate for design requirements which may possibly be present are, of course, also conceivable. It is additionally possible to provide between the cover and the component an adhesive element or an adhesive layer as part of the arrangement, said adhesive component or adhesive layer being, for example, a thin adhesive film which counteracts slipping of the cover with respect to the component.

Refinements of the fastening element are already known from the related art. It is therefore possible, for example, for the fastening element to have a cross section which, being, if appropriate, adapted to the cross section of the depression, provides a way to permit improved securing of the cover in the depression, for example protruding sections which lie inside the depression and which exert a particularly high securing pressure or clamping pressure and/or correspond to respective cutouts in the depression. The fastening element which acts as an insert is generally accommodated between the two edges of the cover in the cutout and presses the edges against the sides of the depression with the result that a relative movement between the edges and the side walls of the depression is avoided. The fastening element can also be embodied in such a way that it covers the depression as well as possible.

The depression in the component, in particular the steering wheel rim, can be implemented in a simple groove with a corresponding cross section, in the simplest case a rectangular cross section. However, it is also conceivable that the component is hollow in the interior and forms an opening into the component.

It is also possible to provide that the fastening element has teeth and/or hooks and/or similar projections in the region provided for pressing the edges within the depression, which at least partially penetrate the material of the cover in order to further impede relative movement.

In addition to the arrangement, the inventors also propose a component, in particular a steering wheel rim of a steering wheel, of a motor vehicle which comprises an arrangement of the type proposed which covers the component. All the embodiments relating to the proposed arrangement, in particular also relating to the depression, can also be analogously transferred to the proposed component.

As already indicated, it is possible to provide that at least one lighting device which can be coupled to a lightguide of the fastening element or to the fastening element which is embodied as a lightguide is arranged in the fastening depression. In this case, it is therefore possible to use the component, in particular the steering wheel rim, to provide the lighting device, which can be coupled to the lightguide, in particular by a suitable coupling face, with the result that there is no need for any complex transmission of energy into the fastening element. LEDs can in turn preferably be provided as lighting device, wherein in the example of a steering wheel the supply of electrical energy can be provided, for example, via the steering column. If the fastening element is provided with a coupling face for the lighting device, which coupling face is extended, for example in the case of a steering wheel rim encircles the entire steering wheel rim, the fastening element can also be positioned more freely or entirely as desired. In the case of an extended lightguide or a plurality of lightguides which form, in particular, different light sources, it is also possible to provide a plurality of lighting device, in particular a plurality of LEDs, in the depression. However, it is also necessary to allow for the fact that "free positionability" can be restricted in the case of a plurality of light sources, in particular if the display possibility already discussed is a decisive factor.

Finally, the inventors propose a motor vehicle comprising the proposed component. In this context, the component is particularly advantageously embodied as a steering wheel rim of a steering wheel. All the embodiments relating to the component or the arrangement can also be transferred to the motor vehicle, with the result that the specified advantages can also be achieved here.

In an advantageous further embodiment of the proposed motor vehicle, a control device for activating and deactivating the light source may be provided. The operation of the light source, that is to say the illumination of the fastening element, is consequently monitored by a control device of the motor vehicle, as a result of which the already-mentioned function of a display device is produced. For this purpose, it can expediently be provided that the control device is designed to activate and/or deactivate the light source, that is to say ultimately to energize the lighting device which is assigned to the light source, as a function of at least one operating property of the motor vehicle. In this context it is possible to provide, for example, that the component is a steering wheel rim of a steering wheel and the operating property is an autonomous driving mode at the activation of which the light source is activated. This means therefore that the driver can detect an autonomous driving mode, for example when a parking assistant, a traffic jam assistant or the like is used, from the illumination of the steering wheel rim, with the result that he can be informed, for example, that he no longer has to activate the steering wheel himself. However, other operating states or operating properties, in particular relating to the steering system, for example various operating modes of a servo system and the like, can also be indicated.

The versatility, flexibility and applicability of the display device formed by making the fastening elements capable of being illuminated can also be increased if, in the case of a plurality of fastening elements and/or in the case of a plurality of light sources per fastening element, the light sources can be actuated independently. In this context, it is possible to provide, for example, that the light sources form a segment display. However, it is also conceivable, in particular in the case of different geometric configuration of the light sources, for example in the form of symbols and the like which can be illuminated, to display a wide variety of operating properties of a motor vehicle through selective activation of the assigned light sources. A segment display can be beneficial, for example, if a continuous parameter, for example the degree of power assistance, is to be displayed as an operating property by the display device which is formed.

However, it is also to be noted at this point that the light source for a fastening element can, even without any actuation, perform a display function, for example if a light source which displays the central position of the steering wheel is used. It is then easily possible to inform a driver where the central position of the steering wheel is located, in particular even if it is very dark in the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
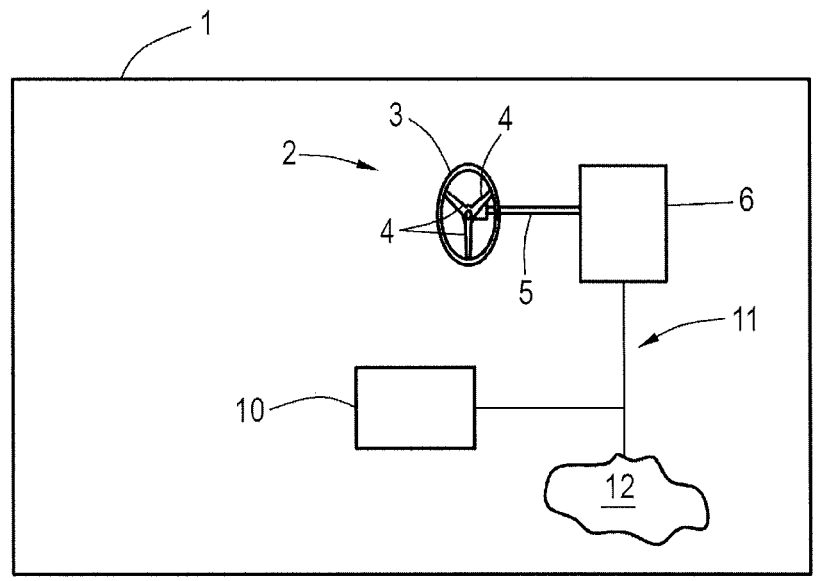
FIG. 1 shows a basic outline of a motor vehicle according to the proposal.

Reference will now be made in detail to the preferred embodiments of the present invention, examples of which are illustrated in the accompanying drawings, wherein like reference numerals refer to like elements throughout.

FIG. 1 shows a basic outline of a motor vehicle 1. It comprises, as is basically known, a steering wheel 2 which has a steering wheel rim 3 and struts 4. The steering wheel 2 can, as is known, be connected to a steering system 6 via a steering column 5.

Figure 2:
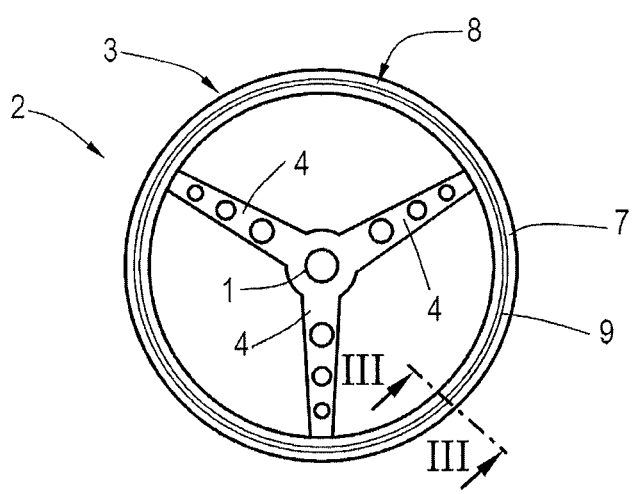
FIG. 2 shows a plan view of a steering wheel in a first embodiment.

FIG. 2 shows a plan view of the steering wheel 2 in a first embodiment. The steering column 5, from which the struts 4 extend, can be seen in a central position. The steering wheel rim 3 as a component is covered by a covering arrangement, which comprises a cover 7 which is placed around the base body of the steering wheel rim 3. A fastening element 8, which acts here as a clamping element is provided for fastening the cover 7, which fastening element 8 is inserted into an encircling fastening depression in the base body of the steering wheel rim 3 in such a way that it presses edges of the cover 7, which lie opposite one another and are folded into the depression, against the walls of the depression and therefore firmly secures the cover 7. Such a fastening element 8 can also be referred to as a "clip".

In this exemplary embodiment, the fastening element 8 is embodied in one piece and is composed completely of a lightguide 9, and therefore forms an encircling light source.

In order to actuate, that is to say to switch on and off, the light source, a control device 10 is now provided, cf. FIG. 1, which control device 10 activates or deactivates the light source, to be more precise a lighting device assigned to the lightguide 9, as a function of an operating property of the motor vehicle 1, with the result that the fastening element 8 also functions in its entirety as a display device. In order to determine the operating property of the motor vehicle 1, the control device 10 is connected to a CAN bus 11 which is only indicated and to which the steering system 6 and other vehicle systems, illustrated schematically at 12, are also connected.

Figure 3:
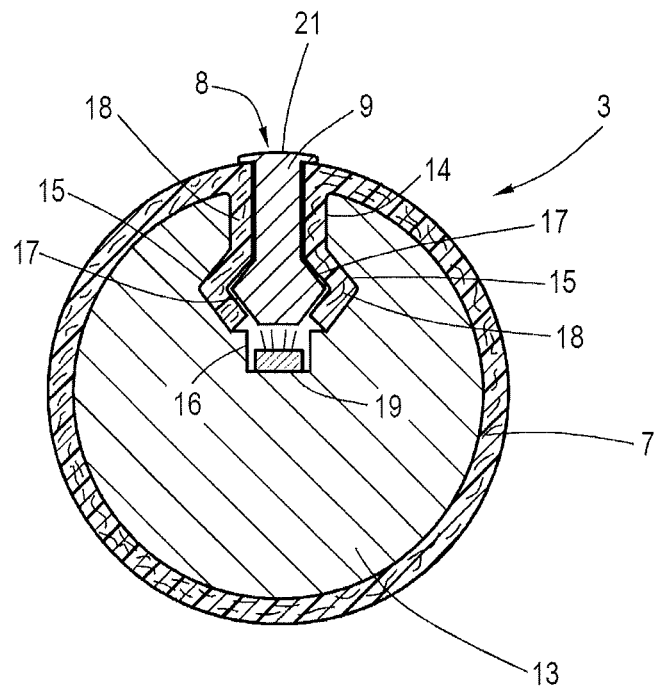
FIG. 3 shows a cross section along the line III-III in FIG. 2 in a first exemplary embodiment.
Figure 4:
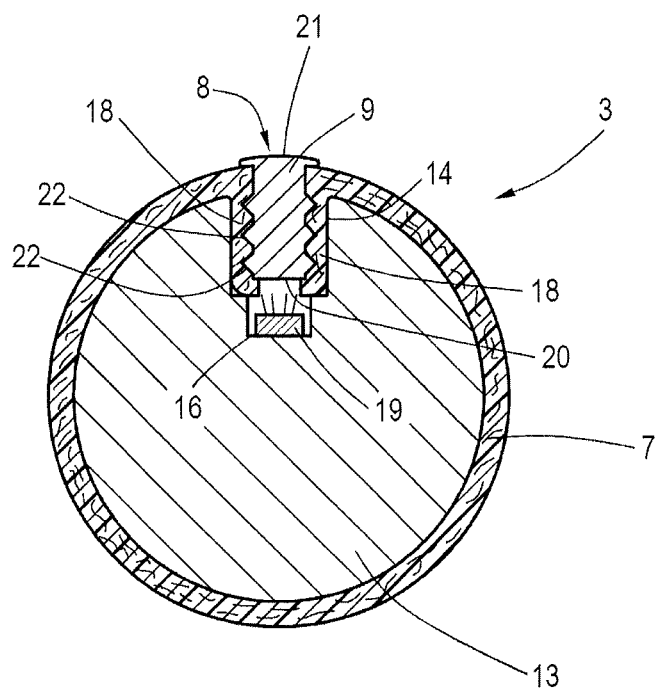
FIG. 4 shows a cross section analogous to FIG. 3 in a second exemplary embodiment.

FIG. 3 and FIG. 4 now show various exemplary embodiments indicating how a specific configuration of the fastening element 8 and of the securing can be performed. This involves sections along the line III-III in FIG. 2. The base body 13 of the steering wheel rim 3, around which the cover 7 is placed, which can be composed, for example, of leather, imitation leather or fabric, can be seen. The cover 7 is flexible, with the result that it can be stretched around the base body 13 and is non-slip, with the result that it provides a good gripping possibility. Exemplary embodiments are conceivable in which an intermediate layer or securing layer is provided between the cover 7 and the base body 13 in order to avoid the cover 7 slipping on the base body 13.

The edges of the cover 7 are bent into the depression 14 which is embodied as a profiled groove and which has, in the lower region, two cutouts 15 and a further cutout 16. The fastening element 8, composed of the lightguide 9, is then pressed into the depression 14. It can be seen that there are projections 17 which correspond to the cutouts 15 and which prevent the fastening element 8 from slipping out and ensure firmer securing after the edges 18 of the cover 7 are also pressed into the cutouts 15.

The cutout 16 is used here to position an LED 19 adjacent to a coupling face 20 of the lightguide 9, wherein a plurality of LEDs 19 are provided distributed over the circumference of the steering wheel rim 3. Toward the outside, the lightguide 9 forms a display face or a light exit face 21, wherein all the further external faces of the lightguide 9, apart from the light exit face 21 and the coupling face 20, are provided with a reflective coating (not illustrated in more detail here) in order to avoid losses. The lightguide 9 also has inhomogeneities and/or diffuser particles (not illustrated in more detail here) which promote uniform exiting of the light, which is input into the lightguide 9 by the LEDs 19, from the light exit face 21, with the result that ultimately when the lighting device 19 are operated in the embodiment in FIG. 2 the entire fastening element 8 irradiates in a uniformly illuminating fashion as a light source.

A slightly modified exemplary embodiment is shown in FIG. 4, in which the depression 14 is embodied with a rectangular cross section with the exception of the cutout 16, and improved securing of the edges 18 of the cover 7 is brought about by teeth 22 which protrude from the fastening element 8 and which press into the material of the cover 7 and secure the latter.

Of course, such teeth or other types of projections of this type, for example hooks, can also be provided in the exemplary embodiment according to FIG. 3.

In the first embodiment according to FIG. 2, when a single light source is formed by the fastening element 8, the control device 10 can, for example, also be designed to switch on this light source when the motor vehicle 1 is in an autonomous operating mode or the like. Basically, it is also possible to provide that the light source is operated whenever the motor vehicle is switched on and therefore display the operationally ready state.

It should also be noted at this point that it is basically also conceivable to provide a lighting device, that is to say, for example, an LED 19, within the fastening element 8, wherein electrical energy can then be produced, for example, by a slip coupling, a spring contact or the like. Basically, power is fed in, as is known, through the steering column 5 and the struts 4.

Figure 5:
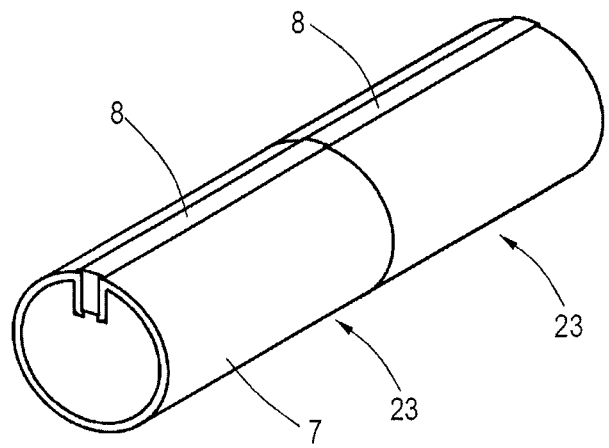
FIG. 5 shows a perspective view of segments of an arrangement according a second embodiment.

FIG. 5 shows a further embodiment of a covering arrangement in a perspective view, wherein the cover 7 comprises a plurality of cover sections 23, wherein each cover section 23 is correspondingly assigned its own fastening element 8.

In this case it is possible to provide that each fastening element 8 can be operated as a separate light source, with the result that it again is composed entirely of the lightguide 9, wherein in the case of independent actuability of the light sources which are formed, it is possible to implement, for example, a segment display.

Figure 6:
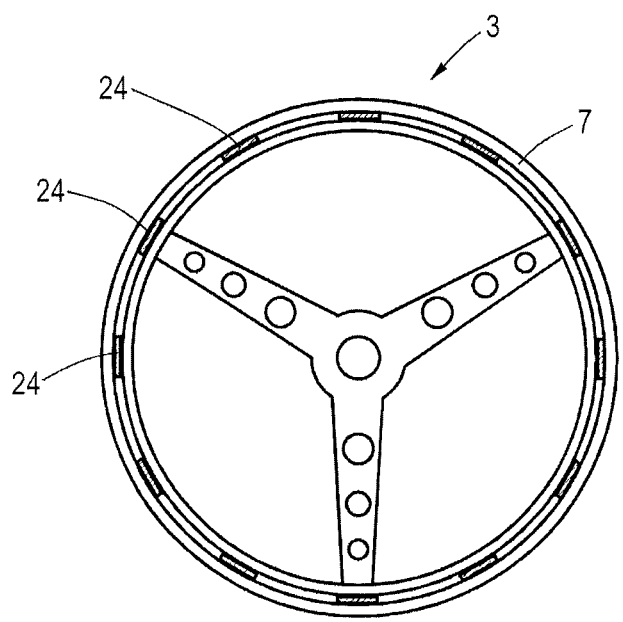
FIG. 6 shows a plan view of a steering wheel rim in a third embodiment.

Such a possibility for implementing a segment display is also shown by the plan view of the steering wheel rim 3 in the embodiment according to FIG. 6, wherein spaced-apart segment light sources 24 are implemented. This can be done by virtue of the fact that the lightguide 9 forms only part of the fastening element 8 or the light exit face 21 is correspondingly restricted.

Figure 7:
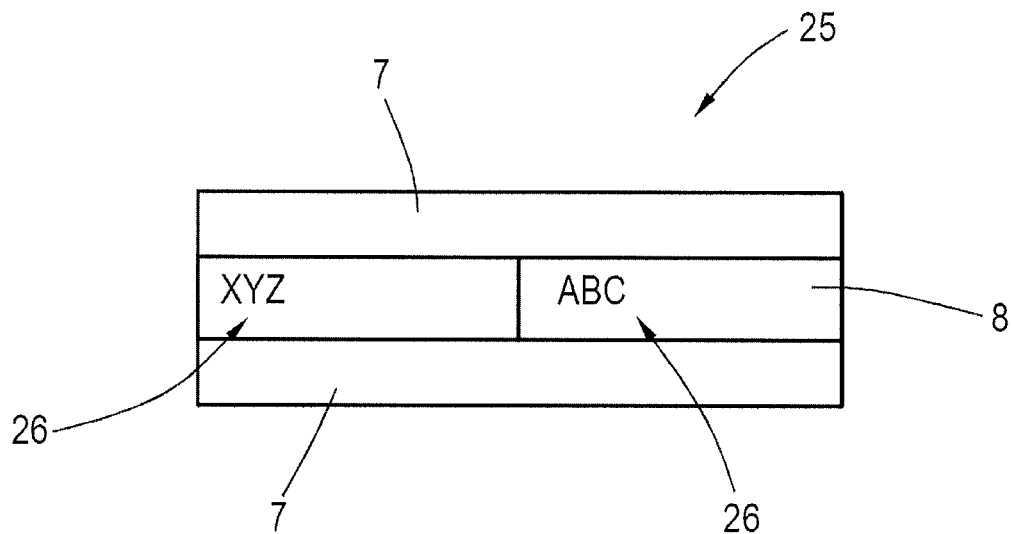
FIG. 7 shows a plan view of a component.

Finally, FIG. 7 shows, in the form of a further embodiment, a further component 25 which is also already covered with a cover 7 which is secured by two fastening elements 8. The light sources form here in their geometric configuration symbols 26, for example texts, which can be illuminated with the result that various information items can be conveyed. This can also be achieved by a corresponding configuration of light exit faces 21 of the lightguide 9, however it is also conceivable to implement characters or symbols 26, or the like which can be backlit by lighting device, in particular LEDs 19 which are installed inside the fastening elements 8.

Figure 8:
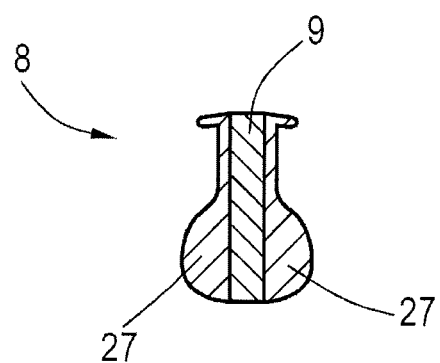
FIG. 8 shows a cross section through a fastening element which can be used.

FIG. 8 shows a cross section for a further fastening element 8 which can be used within the scope of the proposals. Here, only the central portion of the fastening element 8 is formed by the lightguide 9, molded bodies 27 made of a material which is sufficiently resilient to be pressed into the fastening depression 14 and to secure the cover 7 there adjoining said lightguide 9 on both sides. The lightguide 9 can in this case also be formed from a more rigid lightguide material.

In summary, the inventors propose embodying a fastening element 8 in a comprehensive fashion, also as a light source, for example the light source 24, in addition to its fastening function, with the result that it can act as a display device and at the same time provides a more attractive visual configuration.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A steering wheel of a motor vehicle, comprising:
    a steering wheel rim having a fastening depression;
    a lighting device arranged in the fastening depression;
    an arrangement which covers the steering wheel rim, the arrangement comprising:
        a cover placed around the steering wheel rim, formed of a flexible and/or non-slip material, the cover having edges; and
        a clamping fastening element to fasten the edges of the cover in the fastening depression, the fastening element comprising a lightguide coupled to the lighting device arranged in the fastening depression so that the fastening element is embodied as a light source.
2. The steering wheel as claimed in claim 1, wherein
    the lightguide forms a continuous light source about the steering wheel rim, and
    the lightguide comprises diffuser particles and/or at least one roughened surface.
3. The steering wheel as claimed in claim 1,
    wherein the cover comprises a plurality of cover sections which are each assigned a fastening element.
4. The steering wheel as claimed in claim 1,
    wherein cover is formed of leather or imitation leather or fabric.
5. The steering wheel as claimed in claim 1,
    wherein the fastening depression is continuous about the steering wheel rim.
6. The steering wheel as claimed in claim 1, wherein
    the light guide has a light coupling face and a light exit face,
    surface areas of the light guide other than the light coupling face and the light exit face are covered with a reflective coating, and
    the light exit face is configured to have a plurality of light sources and form a segmented display such that around the steering wheel, illuminated segments alternate with non-illuminated segments.
7. The steering wheel as claimed in claim 1, wherein
    the fastening depression has a narrower cross section toward a surface of the steering wheel rim and a wider cross section away from the surface of the steering wheel rim, and
    the fastening element has a projection to fit in the wider cross section of the fastening depression, to press the edges of the cover to the fastening depression.
8. The steering wheel as claimed in claim 7, wherein
    the fastening element comprises the light guide and a resilient molded body, and
    the projection is formed from the resilient molded body.
9. The steering wheel as claimed in claim 1, wherein
    the fastening element comprises teeth, and
    the fastening depression has a cross sectional profile with a shape corresponding to that of the teeth, to retain the fastening element within the fastening depression.
10. The steering wheel as claimed in claim 9, wherein
    the fastening element comprises the light guide and a resilient molded body, and
    the teeth are formed from the resilient molded body.
11. The steering wheel as claimed in claim 1, wherein
    the steering wheel rim comprises first electrical contacts provided in the fastening depression,
    the fastening element comprises second electrical contacts,
    the lighting device is provided on the fastening element, and
    insertion of the fastening element into the fastening depression connects the first and second electrical contacts and arranges the lighting device in the fastening depression.
12. A motor vehicle, comprising:
    a steering wheel rim having a fastening depression;
    a lighting device arranged in the fastening depression;
    an arrangement which covers the steering wheel rim, the arrangement comprising:
        a cover placed around the steering wheel rim, formed of a flexible and/or non-slip material, the cover having edges; and
        a clamping fastening element to fasten the edges of the cover in the fastening depression, the fastening element comprising a lightguide coupled to the lighting device arranged in the fastening depression so that the fastening element is embodied as a light source.
13. The motor vehicle as claimed in claim 12,
    wherein said motor vehicle comprises a control device to activate or deactivate the light source.
14. The motor vehicle as claimed in claim 13,
    wherein the control device activates and deactivates the light source as a function of an operating property of the motor vehicle.
15. The motor vehicle as claimed in claim 14,
    wherein the operating property is an autonomous driving mode, at the activation of which the light source is activated.
16. The motor vehicle as claimed in claim 12, wherein
    there are a plurality of fastening elements,
    there are a plurality of lighting devices,
    each fastening element has a corresponding lighting device, and
    the lighting devices can be activated independently to form a plurality of light sources around the steering wheel.
17. The motor vehicle as claimed in claim 16, wherein
    the motor vehicle further comprises a control device,
    the control device independently activates the lighting devices to form a varying display representing a degree of power assistance.

18. The motor vehicle as claimed in claim 12, wherein
the fastening element comprises a molded body and a
   plurality of lightguides provided in the molded body,
there are a plurality of lighting devices,
each lightguide has a corresponding lighting device, and
the lighting devices can be activated independently to form
   a plurality of light sources around the steering wheel.

19. The motor vehicle as claimed in claim 18, wherein the light sources form a segmented display such that around the steering wheel, illuminated segments alternate with non-illuminated segments.

20. The motor vehicle as claimed in claim 18, wherein
the motor vehicle further comprises a control device,
the control device independently activates the lighting
   devices to form a varying display representing a degree
   of power assistance.

* * * * *

UNITED STATES PATENT AND TRADEMARK OFFICE
CERTIFICATE OF CORRECTION

| | | |
|---|---|---|
| PATENT NO. | : 9,045,078 B2 | Page 1 of 1 |
| APPLICATION NO. | : 14/342654 | |
| DATED | : June 2, 2015 | |
| INVENTOR(S) | : Johannes Tovar et al. | |

It is certified that error appears in the above-identified patent and that said Letters Patent is hereby corrected as shown below:

Title Page, Left Column, (30) Foreign Application Priority Data, Line 2

Delete "Jan. 9, 2011" and insert --Sep. 1, 2011--, therefor.

Signed and Sealed this
Thirteenth Day of October, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 9,045,078 B2 |
| APPLICATION NO. | : 14/342654 |
| DATED | : June 2, 2015 |
| INVENTOR(S) | : Johannes Tovar et al. |

It is certified that error appears in the above-identified patent and that said Letters Patent is hereby corrected as shown below:

This certificate supersedes the Certificate of Correction issued October 13, 2015.
The certificate which issued on October 13, 2015 is vacated since there was no petition to accept an unintentionally delayed priority claim under 35 U.S.C. § 120 approved by the Office of Petitions. The Certificate of Correction was published in error and should not have been issued for this patent.

Signed and Sealed this
Twenty-second Day of December, 2015

Michelle K. Lee
*Director of the United States Patent and Trademark Office*